(12) United States Patent
Chen

(10) Patent No.: US 8,479,518 B1
(45) Date of Patent: Jul. 9, 2013

(54) SYSTEM FOR SUPPLYING A WORKING FLUID TO A COMBUSTOR

(75) Inventor: Wei Chen, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/546,398

(22) Filed: Jul. 11, 2012

(51) Int. Cl.
*F23R 3/34* (2006.01)

(52) U.S. Cl.
USPC .......................................................... 60/733

(58) Field of Classification Search
USPC ................ 60/39.37, 733, 737, 739, 740, 746, 60/747; 431/174
See application file for complete search history.

(56) References Cited

U.S. PATENT DOCUMENTS

| | | | |
|---|---|---|---|
| 3,934,409 A | 1/1976 | Quillevere et al. | |
| 4,040,252 A | 8/1977 | Mosier et al. | |
| 4,045,956 A | 9/1977 | Markowski et al. | |
| 4,112,676 A | 9/1978 | DeCorso | |
| 4,253,301 A | 3/1981 | Vogt | |
| 4,928,481 A | 5/1990 | Joshi et al. | |
| 5,054,280 A | 10/1991 | Ishibashi et al. | |
| 5,099,644 A | 3/1992 | Sabla et al. | |
| 5,127,229 A | 7/1992 | Ishibashi et al. | |
| 5,450,725 A | 9/1995 | Takahara et al. | |
| 5,749,219 A | 5/1998 | DuBell | |
| 5,974,781 A | 11/1999 | Correa et al. | |
| 6,047,550 A | 4/2000 | Beebe | |
| 6,178,737 B1 | 1/2001 | Lenertz et al. | |
| 6,253,538 B1 | 7/2001 | Sampath et al. | |
| 6,868,676 B1 | 3/2005 | Haynes | |
| 6,925,809 B2 | 8/2005 | Mowill | |
| 7,461,719 B2 * | 12/2008 | Tobik et al. | ................... 181/213 |
| 7,665,309 B2 | 2/2010 | Parker et al. | |
| 7,788,897 B2 * | 9/2010 | Campbell et al. | ............ 60/39.55 |
| 8,407,892 B2 * | 4/2013 | DiCintio et al. | ........... 29/889.22 |
| 2009/0084082 A1 | 4/2009 | Martin et al. | |
| 2010/0174466 A1 | 7/2010 | Davis, Jr. et al. | |
| 2011/0131998 A1 | 6/2011 | Nadkarni et al. | |
| 2011/0179803 A1 | 7/2011 | Berry et al. | |
| 2012/0304648 A1 * | 12/2012 | Byrne et al. | ..................... 60/737 |
| 2013/0008169 A1 * | 1/2013 | Belsom et al. | .................. 60/740 |
| 2013/0031783 A1 * | 2/2013 | DiCintio et al. | ........... 29/890.02 |
| 2013/0031906 A1 * | 2/2013 | DiCintio et al. | ................ 60/737 |

FOREIGN PATENT DOCUMENTS

JP 2006138566 6/2006

* cited by examiner

*Primary Examiner* — Phutthiwat Wongwian
(74) *Attorney, Agent, or Firm* — Dority & Manning, PA

(57) ABSTRACT

A system for supplying a working fluid to a combustor includes a fuel nozzle, a combustion chamber downstream from the fuel nozzle, and a flow sleeve that circumferentially surrounds the combustion chamber. A plurality of fuel injectors are circumferentially arranged around the flow sleeve to provide fluid communication through the flow sleeve and into the combustion chamber. A separate cap for each fuel injector defines a separate volume around a different fuel injector outside of the flow sleeve, and a fluid passage through the flow sleeve and into each separate volume provides fluid communication through the flow sleeve and into each separate volume.

20 Claims, 3 Drawing Sheets

US 8,479,518 B1

SYSTEM FOR SUPPLYING A WORKING FLUID TO A COMBUSTOR

FIELD OF THE INVENTION

The present invention generally involves a system and method for supplying a working fluid to a combustor.

BACKGROUND OF THE INVENTION

Combustors are commonly used in industrial and power generation operations to ignite fuel to produce combustion gases having a high temperature and pressure. For example, gas turbines typically include one or more combustors to generate power or thrust. A typical gas turbine used to generate electrical power includes an axial compressor at the front, one or more combustors around the middle, and a turbine at the rear. Ambient air may be supplied to the compressor, and rotating blades and stationary vanes in the compressor progressively impart kinetic energy to the working fluid (air) to produce a compressed working fluid at a highly energized state. The compressed working fluid exits the compressor and flows through one or more fuel nozzles into a combustion chamber in each combustor where the compressed working fluid mixes with fuel and ignites to generate combustion gases having a high temperature and pressure. The combustion gases expand in the turbine to produce work. For example, expansion of the combustion gases in the turbine may rotate a shaft connected to a generator to produce electricity.

In a particular combustor design, one or more fuel injectors, also known as late lean or aft injectors, may be circumferentially arranged around the combustion chamber downstream from the fuel nozzles. A portion of the compressed working fluid exiting the compressor may flow through the fuel injectors to mix with fuel to produce a lean fuel-air mixture. The lean fuel-air mixture may then be injected into the combustion chamber for additional combustion to raise the combustion gas temperature and increase the thermodynamic efficiency of the combustor.

The aft injectors are effective at increasing combustion gas temperatures without producing a corresponding increase in the production of $NO_R$. However, the pressure and flow of the compressed working fluid exiting the compressor may vary substantially around the circumference of the combustion chamber. As a result, the fuel-air ratio flowing through the aft injectors can vary considerably, mitigating the beneficial effects otherwise created by the aft injection of fuel into the combustion chamber. In addition, the compressed working fluid exiting the compressor is often directed or channeled around the outside of the combustion chamber to convectively remove heat from the combustion chamber before flowing through the fuel nozzles. As a result, the portion of the compressed working fluid diverted through the aft injectors may reduce the amount of cooling provided to the outside of the combustion chamber. Therefore, an improved system and method for more evenly supplying the compressed working fluid to the combustor through the aft injectors without reducing the cooling provided to the combustion chamber would be useful.

BRIEF DESCRIPTION OF THE INVENTION

Aspects and advantages of the invention are set forth below in the following description, or may be obvious from the description, or may be learned through practice of the invention.

One embodiment of the present invention is a system for supplying a working fluid to a combustor that includes a fuel nozzle, a combustion chamber downstream from the fuel nozzle, and a flow sleeve that circumferentially surrounds the combustion chamber. A plurality of fuel injectors are circumferentially arranged around the flow sleeve to provide fluid communication through the flow sleeve and into the combustion chamber. A separate cap for each fuel injector defines a separate volume around a different fuel injector outside of the flow sleeve, and a fluid passage through the flow sleeve and into each separate volume provides fluid communication through the flow sleeve and into each separate volume.

Another embodiment of the present invention is a system for supplying a working fluid to a combustor that includes a combustion chamber, a liner that circumferentially surrounds the combustion chamber, and a flow sleeve that circumferentially surrounds the liner. A plurality of fuel injectors are circumferentially arranged around the flow sleeve to provide fluid communication through the flow sleeve and the liner into the combustion chamber. A separate cap for each fuel injector defines a separate volume around a different fuel injector outside of the flow sleeve, and a fluid passage through the flow sleeve and into each separate volume provides fluid communication through the flow sleeve and into each separate volume.

The present invention may also include a system for supplying a working fluid to a combustor that includes a fuel nozzle, a combustion chamber downstream from the fuel nozzle, and a liner that circumferentially surrounds the combustion chamber. A plurality of fuel injectors are circumferentially arranged around the liner to provide fluid communication through the liner and into the combustion chamber. An annular passage circumferentially surrounds the liner. A separate cap for each fuel injector defines a separate volume around a different fuel injector outside of the liner, and a fluid passage connects the annular passage to each separate volume to provide fluid communication from the annular passage into each separate volume.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
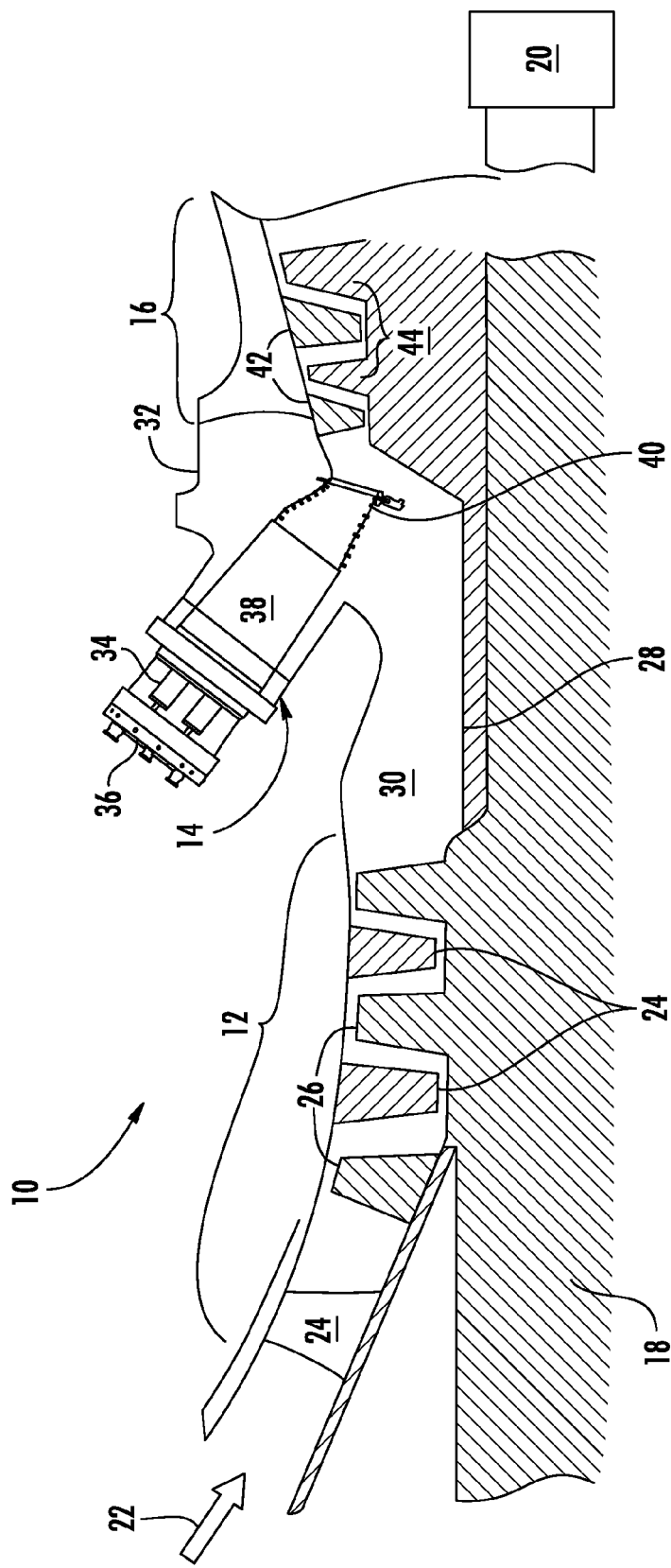
FIG. 1 is a simplified side cross-section view of an exemplary gas turbine within the scope of various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for supplying a working fluid to a combustor. In general, the system includes a combustion chamber and multiple late lean or aft injectors that circumferentially surround the combustion chamber. A separate cap for each injector defines a separate volume around each injector outside of the combustion chamber, and the system diverts or flows a portion of the working fluid along the outside of the combustion chamber and into the separate volume around each injector. In this manner, the working fluid may cool the outside of the combustion chamber before flowing into the separate volumes, through the injectors, and into the combustion chamber. Although exemplary embodiments of the present invention will be described generally in the context of a combustor incorporated into a gas turbine for purposes of illustration, one of ordinary skill in the art will readily appreciate that embodiments of the present invention may be applied to any combustor and are not limited to a gas turbine combustor unless specifically recited in the claims.

FIG. 1 provides a simplified cross-section view of a gas turbine 10 according to one embodiment of the present invention. As shown, the gas turbine 10 generally includes a compressor 12 at the front, one or more combustors 14 radially disposed around the middle, and a turbine 16 at the rear. The compressor 12 and the turbine 16 typically share a common rotor 18 connected to a generator 20 to produce electricity.

The compressor 12 may be an axial flow compressor in which a working fluid 22, such as ambient air, enters the compressor 12 and passes through alternating stages of stationary vanes 24 and rotating blades 26. A compressor casing 28 contains the working fluid 22 as the stationary vanes 24 and rotating blades 26 accelerate and redirect the working fluid 22 to produce a continuous flow of compressed working fluid 22. The majority of the compressed working fluid 22 flows through a compressor discharge plenum 30 to the combustor 14.

The combustor 14 may be any type of combustor known in the art. For example, as shown in FIG. 1, a combustor casing 32 may circumferentially surround some or all of the combustor 14 to contain the compressed working fluid 22 flowing to the combustor 14. One or more fuel nozzles 34 may be radially arranged in an end cover 36 to supply fuel to a combustion chamber 38 downstream from the fuel nozzles 34. Possible fuels include, for example, one or more of blast furnace gas, coke oven gas, natural gas, vaporized liquefied natural gas (LNG), hydrogen, and propane. The compressed working fluid 22 may flow from the compressor discharge plenum 30 along the outside of the combustion chamber 38 before reaching the end cover 36 and reversing direction to flow through the fuel nozzles 34 to mix with the fuel. The mixture of fuel and compressed working fluid 22 flows into the combustion chamber 38 where it ignites to generate combustion gases having a high temperature and pressure. The combustion gases generally flow out of the combustion chamber 38 through a transition duct 40 to the turbine 16.

The turbine 16 may include alternating stages of stationary vanes 42 and rotating blades 44. The first stage of vanes 42 redirects and focuses the combustion gases onto the first stage of blades 44. As the combustion gases pass over the first stage of blades 44, the combustion gases expand, causing the blades 44 and rotor 18 to rotate. The combustion gases then flow to the next stage of vanes 42 which redirects the combustion gases to the next stage of blades 44, and the process repeats for the following stages.

Figure 2:
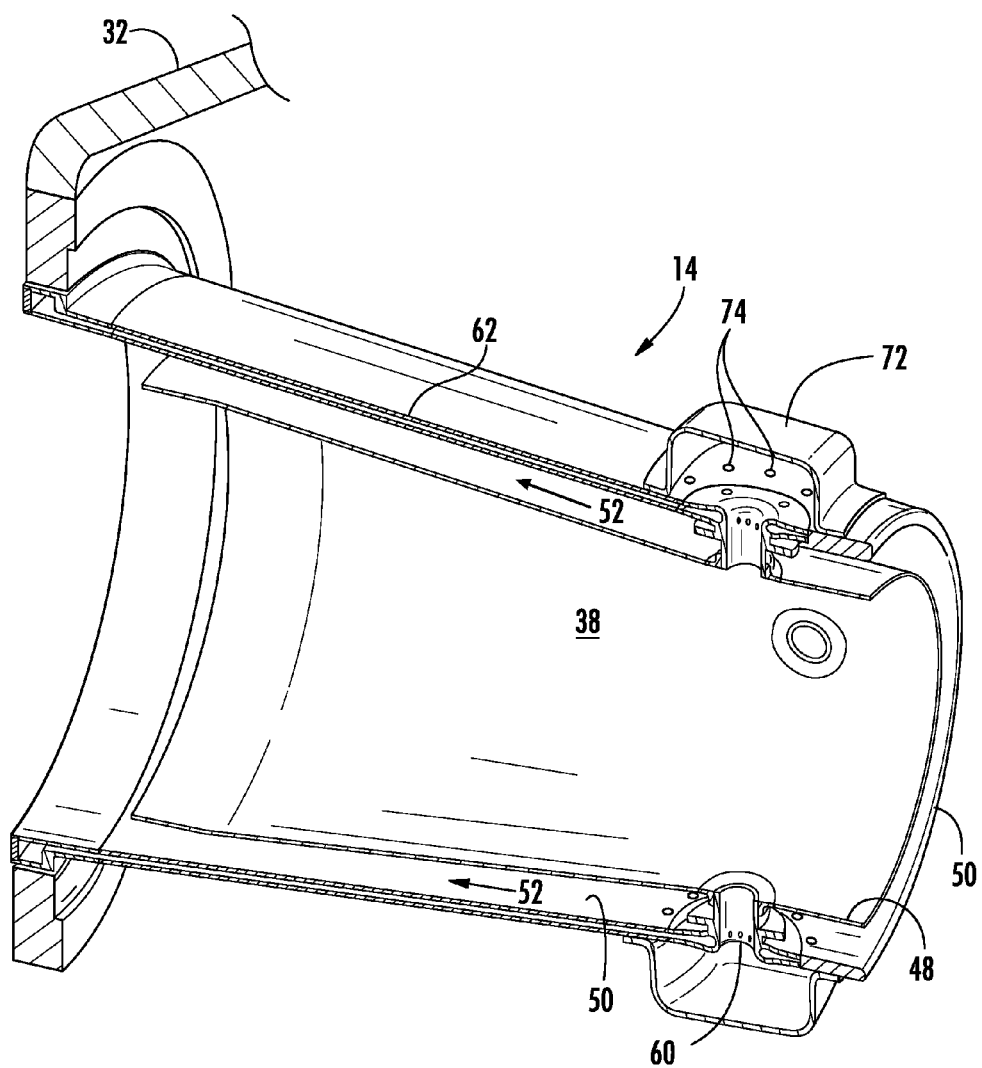
FIG. 2 is a simplified partial perspective and side cross-section view of a portion of the combustor shown in FIG. 1 according to a first embodiment of the present invention.

FIG. 2 provides a simplified side cross-section view of a portion of the combustor 14 shown in FIG. 1 according to a first embodiment of the present invention. As shown, the combustor 14 may include a liner 48 that circumferentially surrounds at least a portion of the combustion chamber 38, and a flow sleeve 50 may circumferentially surround the liner 48 to define an annular passage 52 that surrounds the liner 48. In particular embodiments, the annular passage 52 may be substantially coextensive with the liner 48, as shown in FIG. 2. In this manner, the compressed working fluid 22 from the compressor discharge plenum 30 may flow through the annular passage 52 along the outside of the liner 48 to provide convective cooling to the liner 48 before reversing direction to flow through the fuel nozzles 34 (shown in FIG. 1) and into the combustion chamber 38.

The combustor 14 may further include a plurality of tubes or fuel injectors 60 circumferentially arranged around the combustion chamber 38, liner 48, and flow sleeve 50 downstream from the fuel nozzles 34 to provide fluid communication for at least a portion of the working fluid 22 to flow through the flow sleeve 50 and the liner 48 and into the combustion chamber 38. As shown in FIG. 2, the flow sleeve 50 may include an internal fuel passage 62, and each fuel injector 60 may include one or more fuel ports 64 circumferentially arranged around the fuel injector 60. The internal fuel passage 62 may supply the same or a different fuel to the fuel ports 64 than is supplied to the fuel nozzles 34. The internal fuel passage 62 may thus provide fluid communication for the fuel to flow through the flow sleeve 50 to the fuel ports 64 to allow the fuel and working fluid 22 to mix before or while flowing through the fuel injectors 60 and into the combustion chamber 38. In this manner, the fuel injectors 60 may supply a lean mixture of fuel and working fluid 22 for additional combustion to raise the temperature, and thus the efficiency, of the combustor 14.

Figure 3:
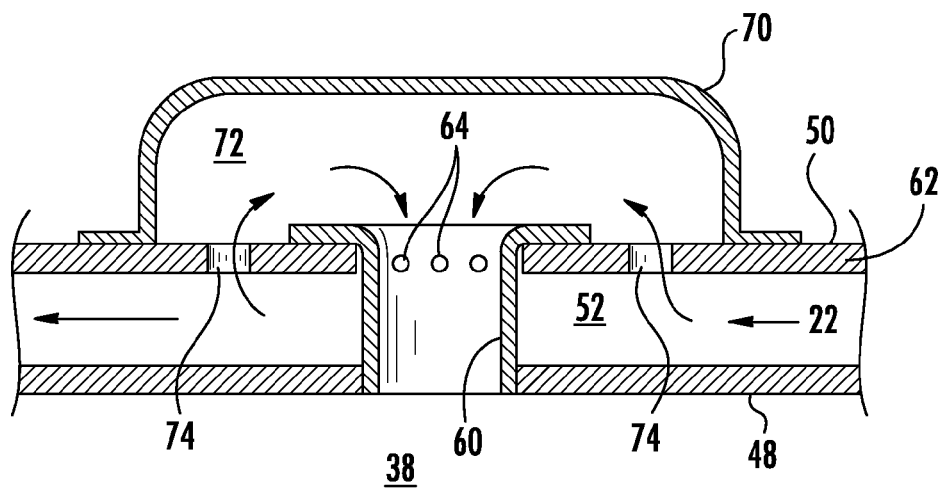
FIG. 3 is a side cross-section view of a fuel injector shown in FIG. 2 according to an embodiment of the present invention.

FIG. 3 provides a side cross-section view of the fuel injector 60 shown in FIG. 2 according to a first embodiment of the present invention. As shown in FIGS. 2 and 3, a separate cap 70 may be associated with one or more of the fuel injectors 60 to define a separate volume 72 around the particular fuel injector 60 outside of the flow sleeve 50. Each cap 70 may be bolted or otherwise fixedly connected to the flow sleeve 50, for example around a circumference of the particular fuel injector 60, to define the separate volume 72 around the particular fuel injector 60. One or more fluid passages 74 through the flow sleeve 50 may provide fluid communication from the annular passage 52, through the flow sleeve 50, and into each separate volume 72. In particular embodiments, the fluid passages 74 through the flow sleeve 50 may be upstream from the particular fuel injector 60, while in other embodiments, the fluid passages 74 through the flow sleeve 50 may circumferentially surround each particular fuel injector 60, as in the particular embodiment shown in FIGS. 2 and 3. In this manner, at least a portion of the working fluid 22 may provide cooling to the outside of the liner 48 before flowing through the fluid passages 74 and into the separate volume 72 surrounding the particular fuel injector 60. As the working fluid 22 flows around the liner 48 inside the annular passage 52, variations in the pressure and/or flow rate of the working fluid 22 exiting the compressor discharge plenum 30 are reduced to produce a more working fluid 22 pressure and/or flow rate entering the separate volume 72. The cap 70 and separate volume 72 created by the cap 70 may thus isolate the particular fuel injector 60 from the pressure and flow variations typically present in the compressor discharge plenum 30. As a result, the working fluid 22 may flow through the particular fuel injector 60 to mix with fuel flowing through the fuel ports 64 before flowing into the combustion chamber 38, and variations in the pressure and/or flow rate of the working fluid 22 reaching the fuel injectors 60 are reduced to produce a more uniform fuel-air mixture injected into the combustion chamber 38.

Figure 4:
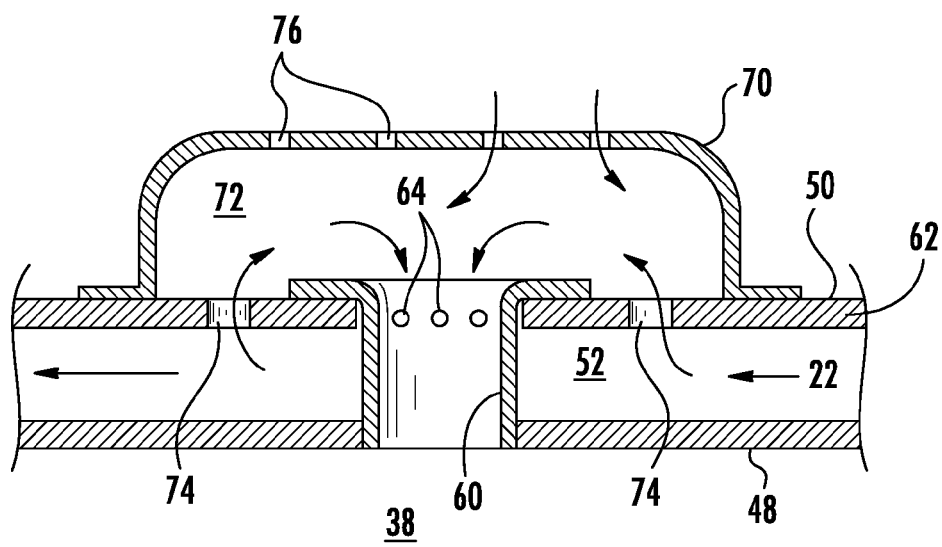
FIG. 4 is a side cross-section view of a fuel injector shown in FIG. 2 according to an alternate embodiment of the present invention.

FIG. 4 provides a side cross-section view of the fuel injector 60 shown in FIG. 2 according to an alternate embodiment of the present invention. This particular embodiment again includes the cap 70, volume 72, and fluid passages 74 as previously discussed with respect to the embodiment shown in FIG. 3. In addition, one or more flow passages 76 through each cap 70 may provide fluid communication from the compressor discharge plenum 30 directly into each separate volume 72. In this manner, the flow passages 76 may allow some of the working fluid 22 to flow directly into the volume 72 and bypass the annular passage 52 to enhance flow distribution and pressure drop associated with the particular fuel injector 60.

The system shown and described with respect to FIGS. 1-4 may also provide a method for supplying the working fluid 22 to the combustor 14. The method may include flowing the working fluid 22 from the compressor 12 through the annular passage 52 that circumferentially surrounds the combustion chamber 38 and liner 48. The method may further include diverting a portion of the working fluid 22 through the fluid passages 74 in the flow sleeve 50 and into the separate volume 72 associated with each cap 70. The diverted working fluid 22 may then flow through the particular fuel injector 60 covered by the cap 70 and into the combustion chamber 38. In particular embodiments, the method may further include flowing the diverted portion of the working fluid 22 out of the volume 72 and through the cap 70 into the compressor discharge plenum 30.

The various embodiments of the present invention may provide one or more technical advantages over existing late lean or aft injection systems. For example, the systems and methods described herein may reduce variations in the pressure and/or flow of the working fluid 22 through each fuel injector 60. As a result, the various embodiments require less analysis to achieve the desired fuel-air ratio through the fuel injectors 60 and enhance the intended ability of the fuel injectors 60 achieve the desired efficiency and reduced emissions from the combustor 14. In addition, the various embodiments described herein may supply the working fluid 22 to the fuel injectors 60 without reducing the amount of cooling provided by the working fluid 22 to the combustion chamber 38 and/or the liner 48.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for supplying a working fluid to a combustor, comprising:
   a. a fuel nozzle;
   b. a combustion chamber downstream from the fuel nozzle;
   c. a flow sleeve that circumferentially surrounds the combustion chamber;
   d. a plurality of fuel injectors circumferentially arranged around the flow sleeve, wherein the plurality of fuel injectors provide fluid communication through the flow sleeve and into the combustion chamber;
   e. a separate cap for each fuel injector, wherein each separate cap defines a separate volume around a different fuel injector outside of the flow sleeve; and
   f. a fluid passage through the flow sleeve and into each separate volume, wherein each fluid passage provides fluid communication through the flow sleeve and into each separate volume.

2. The system as in claim 1, wherein each separate cap is connected to the flow sleeve.

3. The system as in claim 1, wherein each separate cap is connected to the flow sleeve around a circumference of the different fuel injector.

4. The system as in claim 1, further comprising a flow passage through each separate cap.

5. The system as in claim 1, wherein each fluid passage through the flow sleeve is upstream from each different fuel injector.

6. The system as in claim 1, further comprising a plurality of fluid passages through the flow sleeve and into each separate volume.

7. The system as in claim 6, wherein the plurality of fluid passages through the flow sleeve circumferentially surround each different fuel injector.

8. The system as in claim 1, further comprising a fuel passage through the flow sleeve in fluid communication with each fuel injector.

9. A system for supplying a working fluid to a combustor, comprising:
   a. a combustion chamber;
   b. a liner that circumferentially surrounds the combustion chamber;
   c. a flow sleeve that circumferentially surrounds the liner;
   d. a plurality of fuel injectors circumferentially arranged around the flow sleeve, wherein the plurality of fuel injectors provide fluid communication through the flow sleeve and the liner into the combustion chamber;
   e. a separate cap for each fuel injector, wherein each separate cap defines a separate volume around a different fuel injector outside of the flow sleeve; and
   f. a fluid passage through the flow sleeve and into each separate volume, wherein each fluid passage provides fluid communication through the flow sleeve and into each separate volume.

10. The system as in claim 9, wherein each separate cap is connected to the flow sleeve.

11. The system as in claim 9, wherein each separate cap is connected to the flow sleeve around a circumference of the different fuel injector.

12. The system as in claim 9, further comprising a flow passage through each separate cap.

13. The system as in claim 9, wherein each fluid passage through the flow sleeve is upstream from each different fuel injector.

14. The system as in claim 9, further comprising a plurality of fluid passages through the flow sleeve and into each separate volume.

15. The system as in claim 14, wherein the plurality of fluid passages through the flow sleeve circumferentially surround each different fuel injector.

16. A system for supplying a working fluid to a combustor, comprising:
   a. a fuel nozzle;
   b. a combustion chamber downstream from the fuel nozzle;
   c. a liner that circumferentially surrounds the combustion chamber;
   d. a plurality of fuel injectors circumferentially arranged around the liner, wherein the plurality of fuel injectors provide fluid communication through the liner and into the combustion chamber;
   e. an annular passage that circumferentially surrounds the liner;
   f. a separate cap for each fuel injector, wherein each separate cap defines a separate volume around a different fuel injector outside of the liner; and
   g. a fluid passage that connects the annular passage to each separate volume, wherein each fluid passage provides fluid communication from the annular passage into each separate volume.

17. The system as in claim 16, wherein the annular passage is substantially coextensive with the liner.

18. The system as in claim 16, further comprising a flow passage through each separate cap, wherein each flow passage provides fluid communication out of each separate volume through each separate cap.

19. The system as in claim 16, wherein each fluid passage is upstream from each different fuel injector.

20. The system as in claim 16, further comprising a plurality of fluid passages that connect the annular passage to each separate volume.

* * * * *